Feb. 3, 1959  W. A. HUMPHREY  2,872,561
ELECTRIC FRY PAN
Filed April 26, 1956  2 Sheets-Sheet 1
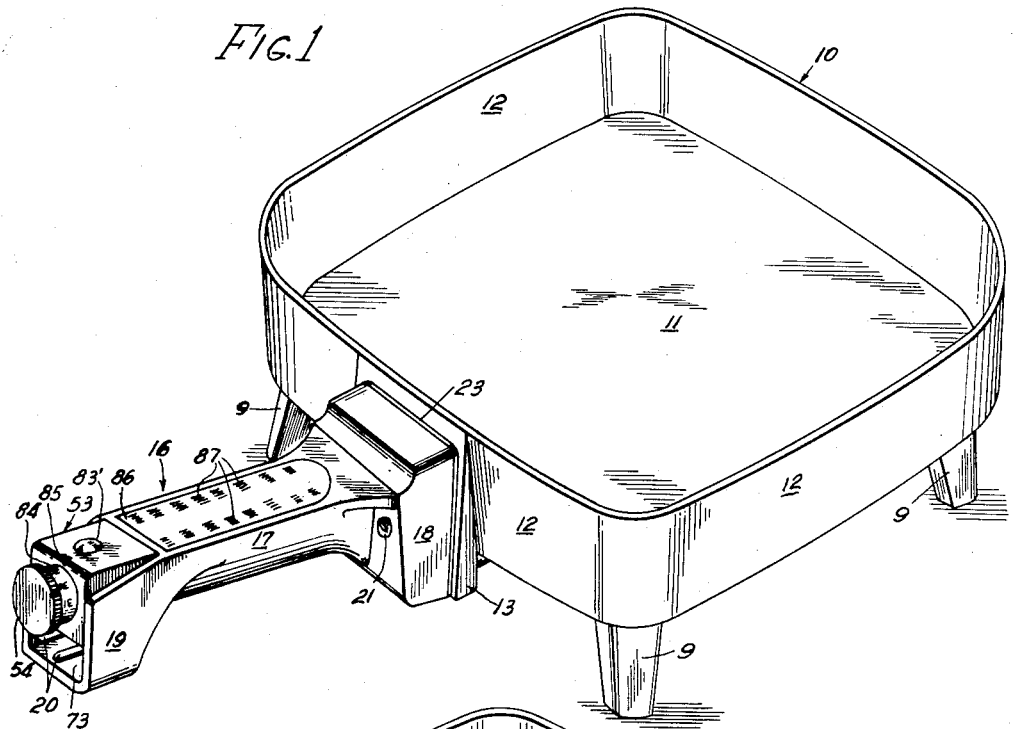
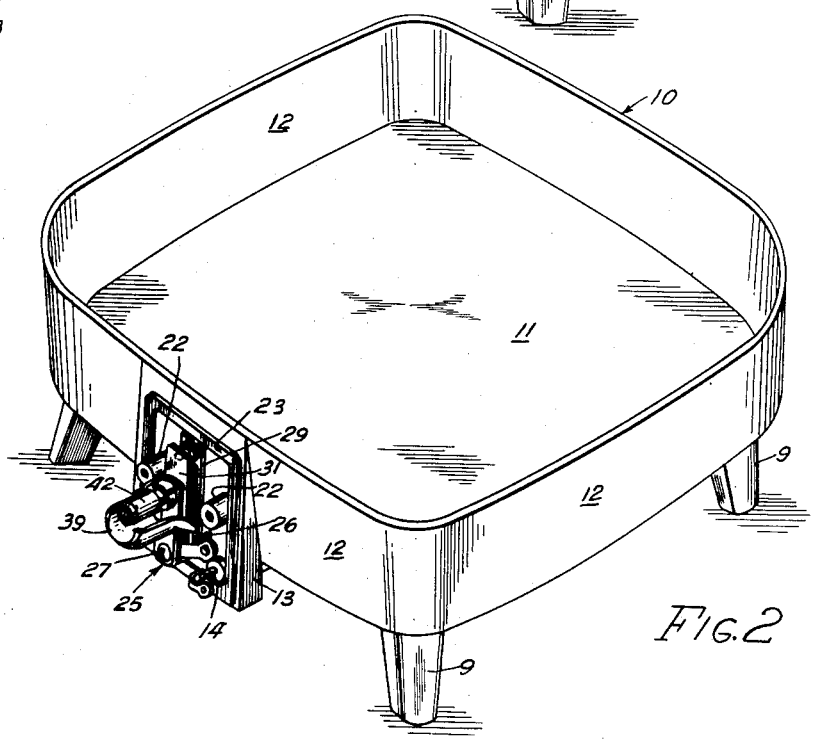

Feb. 3, 1959 W. A. HUMPHREY 2,872,561
ELECTRIC FRY PAN
Filed April 26, 1956 2 Sheets-Sheet 2
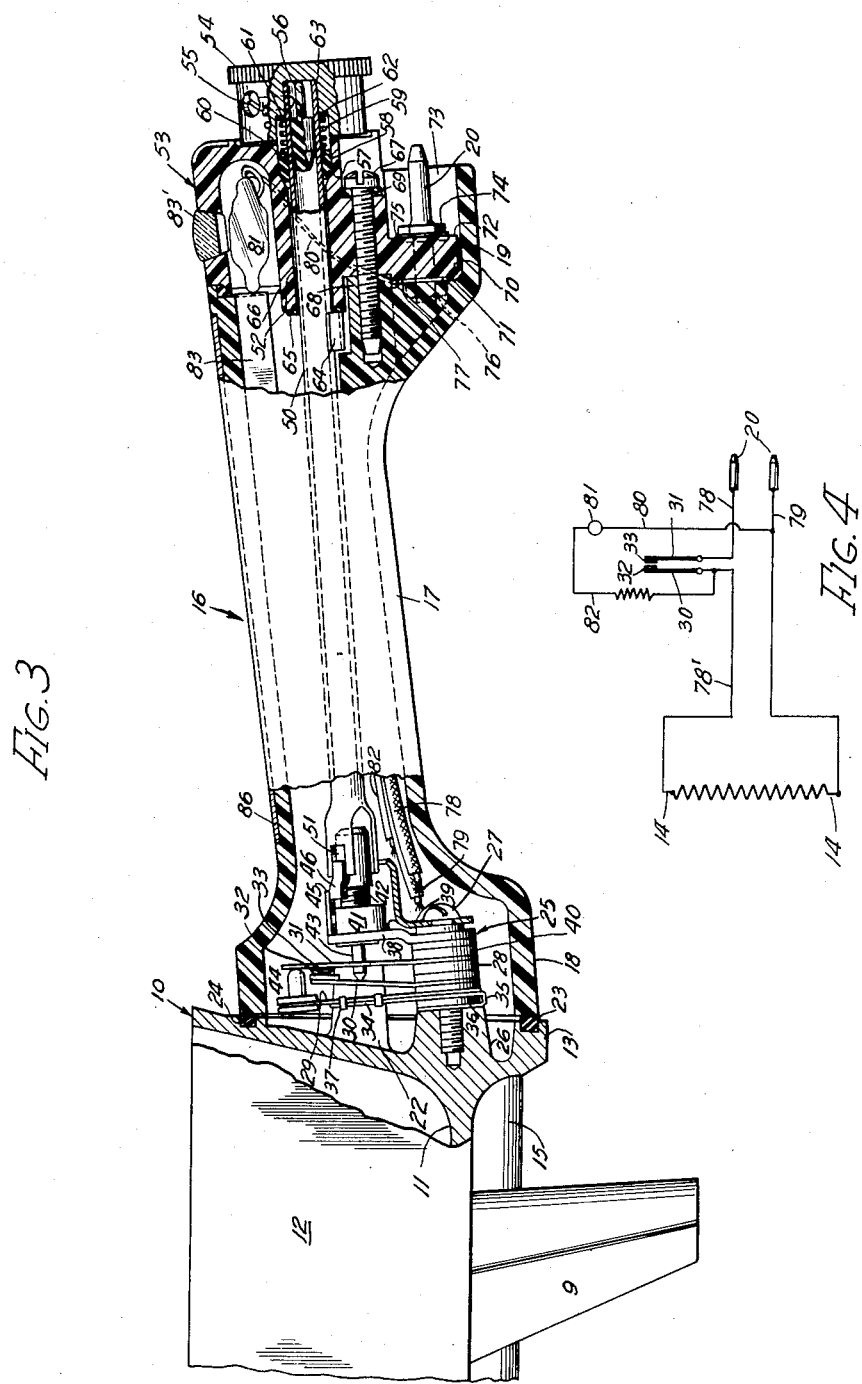

United States Patent Office 2,872,561
Patented Feb. 3, 1959

2,872,561

ELECTRIC FRY PAN

Warren A. Humphrey, Canton, Ohio, assignor to The Hoover Company, North Canton, Ohio, a corporation of Ohio Application April 26, 1956, Serial No. 580,938

6 Claims. (Cl. 219—44)

The present invention relates to portable electrically heated cooking utensils and more particularly to a portable fry pan and a control therefor in which the entire fry pan including the control may be immersed for washing purposes.

According to the present invention an electric heating element is embedded in the base of the fry pan, the thermostat for maintaining its temperature at a predetermined value is mounted on the side of the pan in good heat conducting relationship therewith, and the thermostat is concealed by a removable handle which houses a control mechanism for regulating the temperature setting of the thermostat so as to vary the cooking temperature. The electrical contacts project from the end of the handle and the entire assembly is sealed against the entrance of water so that the entire pan may be immersed in water for washing. If desired a slight pressure may be applied to the interior of the handle to aid in preventing water from entering the interior of the handle and possibly damaging the control mechanism.

Other objects and advantages of the present invention will become apparent as the description proceeds when taken in connection with the accompanying drawings in which.

Fig. 1 is a perspective view of the fry pan of the present invention showing the handle assembled, Fig. 2 is a perspective view similar to that of Fig. 1 showing the fry pan with the handle removed and how the thermostat is mounted, Fig. 3 is a sectional view taken longitudinally through the handle showing the details of the control assembly, and Fig. 4 is a wiring diagram.

The fry pan of the present invention is generally represented by the reference numeral 10 and comprises a flat bottom 11 and upstanding sides 12 made of cast aluminum. A land 13 for the attachment of the handle is cast integrally with the wall 12 and a heating element the terminals of which are shown at 14 is cast in situ in a rib 15 (Fig. 3) in the bottom 11. The pan 10 is supported on suitable legs 9 which may be secured to the bottom 11 in any suitable manner. The legs 9 may be made of metal and suitably heat insulated from the bottom 11 or they may be made of a suitable heat resistant heat insulating material.

The handle is generally indicated by the reference numeral 16 and includes a hand grip portion 17, an inner enlarged portion 18 forming a housing for the thermostat and an outer enlarged portion 19 which performs the dual function of preventing the hand from slipping backwardly from the hand grip portion 17 and of housing a terminal member including the male terminal prongs 20.

The handle 16 is made of a suitable heat resistant plastic material such as "Bakelite" and is secured to the land 13 by screws 21, threaded into bosses 22 projecting from the side 12 of the pan 10 within the outline of land 13 suitable gaskets (not shown) being positioned beneath the heads of screws 21. A sealing gasket 23 of heat resistant gasket material is positioned within a groove 24 in the land 13, is contacted by the periphery of the enlargement 18 and is compressed into the groove 23 when the screws 21 are threaded into the bosses 22.

The thermostat as generally indicated by the reference numeral 25 and is secured to a boss 26, cast integrally with the pan by means of a screw 27 which passes through an insulated standard 28 of a construction which will later appear. The thermostatic switch proper comprises a bimetallic element 29, two spring arms 30 and 31 carrying contacts 32 and 33, and a heat conducting element 34. The heat conducting element 34 is formed with a reversely turned end 35, the short leg 36 of which is in contact with the boss 26 and its long arm is connected to the bimetallic element 29 intermediate its ends by means of clips 37. The purpose of the heat conductor 34 is to conduct heat quickly from the boss 26 to the bimetallic element 29 so that the latter will respond quickly to the temperature changes of the pan 10 so as to prevent "overshoot" of the thermostat.

Spring arms 30 and 31 have suitable terminals extending on either side of the post 28, one of which is connected to one of the terminals 14 of the heating element and the other is connected to a lead wire to be referred to hereinafter.

A supporting bracking 38 and a guard element 39 are also carried by the supporting post 28. Insulating washers 40 separate the legs of the heat conductor 34, separate the bimetallic element 29 from the spring arm 30, separate the spring arms 30 and 31 from each other, separate the spring arm 31 from the bracket 38 and separate the bracket 38 from the guard 39.

A female screw element 41 is attached to the outer end of bracket 38 and threadably receives the male adjusting screw 42 having a pointed extension 43 which passes through an opening in the spring element 31 into contact with the spring element 30. The spring elements 30 and 31 are biased toward each other so that the contacts 32, 33 contact each other. The male adjusting screw 42 may be adjusted to separate the contacts 32, 33 various distances, to adjust the temperature setting of the thermostat 25. The tapered end 43 of adjusting screw 42 holds the contact 32 in its fixed position. Upon a rise in temperature of the pan 10, heat will be transmitted from boss 26, through heat conductor 34. to the bimetallic element 29 and causes it to flex to the right as viewed in Fig. 3, whereby the insulating pin 44 on the end of bimetal 29 will contact the end of spring element 31 and move it to the right to separate contacts 32, 33 and thus interrupt the flow of current to the heating element. The bimetallic element 29 will then start to cool and flex to the left whereby the contacts 32, 33 will again make contact and supply current to the heater. The bimetallic element will continue to oscillate in the above manner to open and close contacts 32, 33 to maintain the fry pan 10 at a predetermined temperature determined by the setting of the male adjusting screw 42.

Cooperating lugs 45 and 46 are provided on the female screw member 41 and the male screw 42 whereby the male screw 42 may not be rotated through an angle of more than 360°.

The temperature setting of the thermostat 25 is adapted to be adjusted by a hollow shaft 50 surrounding the end of adjusting screw 42 and formed with a slot 51 which cooperates with the lug 46 on screw 42 to form a splined driving connection between the shaft 50 and the adjusting screw 42. The shaft 50 extends through the hand grip grip portion 17 and the enlargement 19 of the handle 16 and through a bore 52 in a terminal member 53 partially encased in the enlargement 19 and partially forming the contour of the outer end of the handle 16. An adjustable knob 54 is secured to the end of shaft 50 by means of a screw 55 which extends through the shaft 50 behind a sealing plug 56 of heat resistant material, which seals the interior of the shaft 50 from the entrance of water when the pan is completely immersed. The exterior of the shaft 50 is sealed by a gasket 57 closely surrounding the shaft 50 and fitting into an enlargement 58 of the bore 52 formed in a terminal member 53. The gasket 57 may be made of suitable heat insulating material and is spring biased into the enlargement 58 by a compression spring 59, the ends of which abut hardened washers 60 and 61, one abutting against the gasket 57 and the other against the shoulder formed on an enlargement 62 in the bore 63 of the knob 54 whereby the knob 54 and shaft 50 may be freely rotated.

The shaft 50 is held against longitudinal movement by means of a lug 64 pressed outwardly from the wall of the shaft 50 and abutting against the hardened washer 65 which in turn abuts against an extension 66 of the terminal member 53.

The terminal member 53 is secured within the enlargement 19 of handle 16 by screws 67 threaded into bosses 68 formed on handle 16 and sealed by sealing washers 69 of suitable heat resistant gasket material. The terminal member 53 is sealed relative to the interior of handle 16 by a gasket 70 abutting against a shoulder 71 in the enlargement 19.

The male terminal prongs 20 are secured to a relatively thin section 72 of terminal member 53 so as to leave a space 73 within the enlargement 19 into which a female plug may be inserted to electrically connect the prongs 20 to a suitable source of electricity. The prongs 20 include collars 74 abutting sealing washers 75 positioned in recesses in the section 72 to seal against the entrance of water at those points. The prongs 20 are held in place on section 72 by means of nuts 76 as shown which also serve to clamp terminals 77 in place.

The terminals 77 are connected to conductors 78 and 79 one of which is connected to the thermostat 25 and the other to one of the terminals 14 of the heating element and by a conductor 80 to one terminal of a signal light 81, the other terminal of which is connected to thermostat 25 by a conductor 82 so as to be energized when the contacts 32, 33 are closed and the heating element is energized.

The signal lamp 81 is held in place by a rib 83 on the interior of the bore of the handle 16 and is visible through a lens 83' cemented in position in an opening through the top of the terminal member 53.

Suitable indicia 84 indicating various temperature settings and an "off" position is formed on the periphery of knob 54 and cooperates with a reference line 85 on the top of the terminal member 53 to indicate the temperature settings of the thermostat 25. A plate 86 is secured to the top handle 16 and is inscribed with instructions 87 to inform the user of the proper temperature setting for cooking various foods.

The guard 39 may be made of suitable insulating material and is for the purpose of preventing the conductors 78, 79 and 82 from interfering with the adjustment of the thermostat 25.

*Assembly*

The pan 10 is first cast with the heating element embedded in rib 15, with the terminals 14 projecting outwardly from one side thereof, with the land 13 surrounding the terminals 14, with the boss 26 for attachment of the thermostat 25 and with bosses 22 for the reception of the handle attaching screws 21.

The casting thus formed may be machined to form a flat face on the land 13 for the attachment of the handle 16, the groove 24 formed for the reception of a gasket 23, the boss 26 machined, drilled and tapped for the reception of the thermostat attaching screw 27 and the bosses 22 machined, drilled and tapped for the reception of handle attaching screws 21.

The legs 9 may then be secured to the pan 10 in any suitable manner.

The thermostat 25 is preassembled as a unit in a manner known in the art and then assembled to the boss 26 by means of the screw 27, care being taken that the guard 39 is placed in position on top of standard 28 beneath the head of the screw 27.

One of the terminals 14 may then be connected by a suitable conductor 78' to one of the terminals of the spring arms 30 or 31. One of the conductors 78 or 79 is then attached to the other terminal 14 and the other connected to the terminal of the remaining spring arms 30 or 31. Conductor 82 is connected to the thermostatic switch 25 so that the light 81 is energized when the contacts 32, 33 are closed. The conductors 78, 79 and 82 have an excess length so that the terminal member 53 may be attached in a manner which will later appear.

The gasket 23 may then be assembled within the groove 24 and the handle attached to land 13 by threading screws 21 and to the threaded bosses 22, care being taken that the conductors 78, 79 and 82 are first threaded through the hollow of the handle 16.

The shaft 50 is then inserted into the hollow of the handle 16 and rotated until groove 51 is in alignment with the lug 46 and its inner end assembled over the end of adjusting screw 42. The washer 65 is then slid over the outer end of shaft 50 against lug 64. The plug 56 may be pressed into the end of shaft 50 at any time before the knob 54 is attached.

The terminal member 53 is preassembled before assembly into the enlarged portion 19 of handle 16. Prongs 20 are assembled to the section 72 by placing the sealing washers 75 in the recesses in section 72 with the collars 74 abutting the washers 75. The terminals 77 may then be placed over the inner end of prongs 20, the conductor 80 and one of the conductors 78 or 79 being connected to one of the terminals 77 and the other conductor 78 or 79 connected to the other terminal 77 and the nuts 76 tightened. The lamp 81 may then be placed in the recess in terminal member 53 with one terminal connected to conductor 80 and the other to conductor 82 and the terminal member 53 is ready for assembly into the enlarged portion 18 of handle 16.

The gasket 70 is then placed against shoulder 71 and the terminal member 53 inserted into the interior of the enlargement 19 about the shaft 50, care being taken that the excess wire of conductors 78, 79 and 82 is fed into the hollow of the handle 16 and that the lamp 81 is positioned against the rib 83.

The insulating washers 69 are then placed over screws 67 which are then threaded into the bosses 68 so as to press the gaskets 69 and 70 and form water tight joints at those points.

The gasket 57, washers 60 and 61 and spring 59 are assembled over the end of shaft 50 in the position shown in Fig. 3, the knob 54 slid over the shaft and secured thereto by means of the screw 55, it being noted that the screw 55 pierces a shaft 50 behind the plug 56 so that no water can enter the interior of the handle 16 by that route.

The entire fry pan may then be chilled and the lens 83 cemented in place in the opening above the light 81. When the pan returns to room temperature there will be a slight pressure within the handle 16 to aid in the prevention of water leaking into the handle when the pan is immersed for washing.

It is to be noted that shaft 50 is held against longitudinal movement by the engagement of the lug 64 with the washer 65 under the bias of spring 59 tending to move the shaft 50 to the right as viewed in Fig. 3 which action also presses the gasket 57 into sealing engagement with tapered bore of the terminal member 53 while permitting rotary movement of the shaft 50 for adjusting the temperature setting of the thermostat 25.

The indicia on the knob 54 is so related to the adjusting screw 42 of thermostat 25 that the setting as indicated by the knob 54 will be maintained by the thermostat 25.

Operation

The user first determines the proper setting for cooking the desired food from the instructions on plate 86 and turns knob 54 from its "off" setting to the proper cooking temperature. The bimetallic element 29 will oscillate back and forth to open and close contacts 32 and 33 to energize and deenergize the heating element as the pan temperature fluctuates slightly to maintain the pan at its proper cooking temperature.

When the food is properly cooked it may be removed and the pan completely immersed in a cleansing solution without danger of the solution entering the interior of the hollow handle 16 and damaging the electrical control element.

It is to be noted that when the pan is hot, the pressure within the handle 16 will be still higher above atmospheric pressure and effectively prevent the entrance of water into the interior of the handle.

Since the female plug has been removed from the recess 73 the male prongs 20 will be exposed but no harm can be done by the cleansing solution since the prongs are sealed from the interior of the handle 16.

From the foregoing it can be seen that the present invention provides an electrically heated fry pan in which the entire electrical control system is housed within the handle and sealed from the entrance of water or other cleansing solution so that the pan may be completely immersed for cleansing purposes and insuring that no liquid can come into contact with electrical parts of the pan with the exception of the male connecting prongs 20.

While I have shown and described but a single embodiment of my invention it is to be understood that that embodiment is to be taken as illustrative only and not in a limiting sense. I do not wish to be limited to the particular structure shown and described but wish to include all equivalent variations thereof except as limited by the scope of the claims.

I claim:

1. An electrically heated fry pan comprising, a fry pan body, an electrical heating element associated therewith, an adjustable thermostatic switch for controlling the temperature of said body, said thermostatic switch being mounted on the side of said body adjacent the terminals of said heating element and in good heat transfer relation to said body and having a rotary adjusting element, a hollow handle having an enlarged inner end removably attached to said body with said large inner end surrounding said thermostatic switch, a watertight seal between said large inner end of said handle and said body, a control shaft drivingly attached to said rotary adjusting element and extending through said hollow handle, a control knob drivingly connected to said shaft at the outer end of said handle, a watertight seal between said shaft and handle inwardly of said control knob, electric terminals secured to the outer end of said handle and being electrically connected by conductors extending through the hollow of said handle to said thermostatic switch and heating element, and sealing means between said terminals and the interior of said handle to prevent the entrance of water into the interior of said handle whereby the entire pan may be immersed during cleansing operations.

2. A fry pan according to claim 1 including an electric signal light within the interior of said handle electrically connected to said terminals and thermostatic switch so as to be energized when said switch is closed, and a lens positioned in an opening in the wall of said handle over said light whereby said light is visible from the exterior of said handle, said lens being sealed in said opening to prevent the entrance of water into the interior of said handle.

3. A fry pan according to claim 1 in which said shaft is hollow and a sealing plug on the interior of said shaft inwardly of the connection between said control knob and shaft.

4. A fry pan according to claim 1 in which said handle includes an enlarged outer end with a terminal mounting element mounted therein, said shaft extending through a bore in said terminal mounting element, said watertight seal being positioned between the bore of said terminal mounting element and said shaft and a seal between the inner end of said terminal mounting element and the interior of said handle.

5. A fry pan according to claim 4 including male terminal prongs mounted on said terminal mounting element below said shaft and being sealed from the interior of said handle, and said enlarged outer end providing space about said male terminal prongs for the reception of a female connector.

6. A fry pan according to claim 1 including cooperating stops between said shaft and the interior of said handle providing for the rotation of said shaft relative to said handle and preventing relative reciprocation between them, and a compression spring positioned about said shaft between said control knob and said watertight seal for holding said stops in contact with each other and said seal in sealing engagement with the bore of said handle.

References Cited in the file of this patent

UNITED STATES PATENTS

| | | |
|---|---|---|
| 1,699,144 | Hilliard | Jan. 15, 1929 |
| 2,530,643 | Berg et al. | Nov. 21, 1950 |
| 2,571,782 | Swenson | Oct. 16, 1951 |
| 2,744,995 | Jepson | May 8, 1956 |
| 2,823,293 | Levine | Feb. 11, 1958 |

FOREIGN PATENTS

| | | |
|---|---|---|
| 664,113 | Great Britain | Jan. 2, 1952 |